N. B. MILLER.
HARROW.
No. 73,626. Patented Jan. 21, 1868.
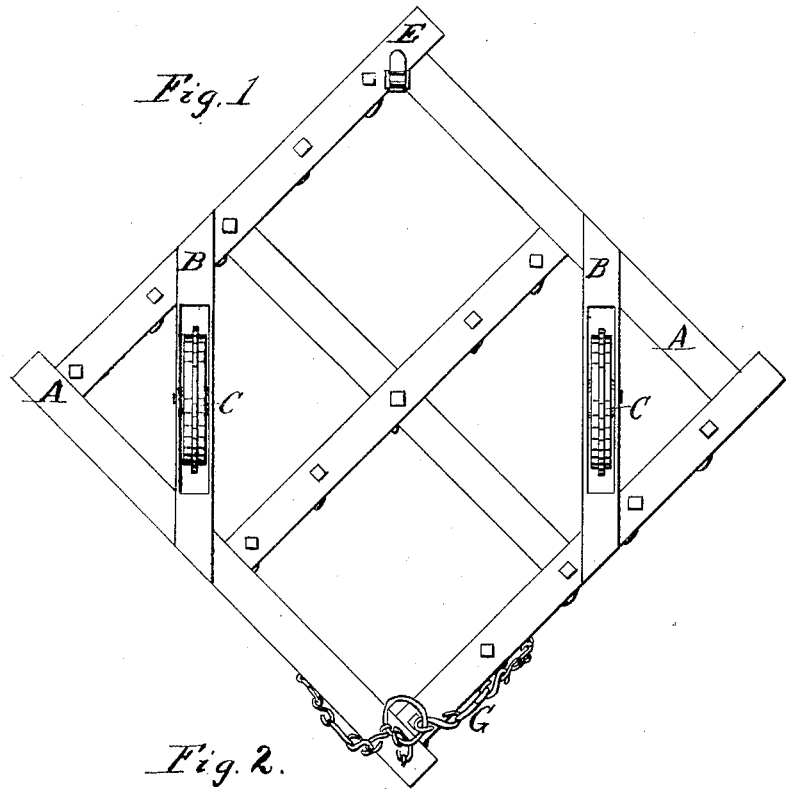
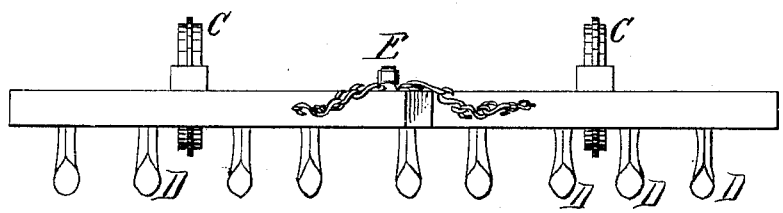
Witnesses
A. N. Marr
Cornelius Ca.
Inventor
Nicholas B. Miller
per
Alexander & Mason
Atty.

United States Patent Office.

NICHOLAS B. MILLER, OF ORION, MICHIGAN.

Letters Patent No. 73,626, dated January 21, 1868.

---

IMPROVEMENT IN HARROWS.

---

The Schedule referred to in these Letters Patent and making part of the same.

---

TO ALL WHOM IT MAY CONCERN:

Be it known that I, NICHOLAS B. MILLER, of Orion, in the county of Oakland, and in the State of Michigan, have invented certain new and useful Improvements in Harrows; and do hereby declare that the following is a full, clear, and exact description thereof, reference being had to the accompanying drawings, and to the letters of reference marked thereon.

In the annexed drawings, making part of this specification, A represents a square harrow-frame, made in any of the known and usual ways, and provided on its under side with any suitable teeth, D D. Upon the upper side, and across two opposite corners of this frame, are secured two bars, B B. These bars are provided with slots or openings through them, and in these openings are placed the wheels C C, the axles of said wheels having their bearings in the bars. To the forward corner of the harrow-frame is secured a chain, G, and on the rear corner is secured a caster-wheel, E. The object of providing the upper side of the frame with three wheels is, that when the said frame is turned on its back, in order to move it from one place to another, it will roll upon these wheels, and thus not only move easily, but prevent damage to the frame.

Having thus fully described my invention, what I claim as new, and desire to secure by Letters Patent, is—

The frame A, teeth D D, bars B B, with wheels C C and wheel E, when constructed, combined, and arranged as and for the purposes specified.

In testimony that I claim the foregoing, I have hereunto set my hand, this 29th day of October, 1867.

NICHOLAS B. MILLER.

Witnesses:
A. W. BURTT,
H. W. BOTSFORD.